United States Patent [19]
Wilson et al.

[11] Patent Number: 5,655,986
[45] Date of Patent: Aug. 12, 1997

[54] FULL-TIME TRANSFER CASE WITH SYNCHRONIZED SINGLE PLANETARY GEAR REDUCTION UNIT

[76] Inventors: Robert J. Wilson, 6711 Pottery Rd., Warners, N.Y. 13164; Randolph C. Williams, 8836 S. Willow St., Weedsport, N.Y. 13166; John D. Zalewski, 303 Balsam St., Liverpool, N.Y. 13088; Sanjeev K. Varma, 2406 Euclid Ave., Syracuse, N.Y. 13224

[21] Appl. No.: 596,874

[22] Filed: Feb. 13, 1996

[51] Int. Cl.$^6$ ............................................. B60K 17/34
[52] U.S. Cl. ........................ 475/204; 475/206; 475/208; 180/248; 180/249
[58] Field of Search ........................... 475/204, 206, 475/207, 208; 180/233, 247, 248, 249

[56] References Cited

U.S. PATENT DOCUMENTS

| | | | |
|---|---|---|---|
| 3,335,616 | 8/1967 | Perkins | 74/331 |
| 4,831,894 | 5/1989 | Braun | 74/331 X |
| 5,092,188 | 3/1992 | Fujikawa et al. | 74/335 |
| 5,363,938 | 11/1994 | Wilson et al. | 180/249 X |
| 5,443,429 | 8/1995 | Baxter, Jr. | 475/206 X |

FOREIGN PATENT DOCUMENTS 3-248919  11/1991  Japan.

*Primary Examiner*—Khoi Q. Ta
*Attorney, Agent, or Firm*—Harness, Dickey & Pierce, P.L.C.

[57] ABSTRACT

A power transfer system is disclosed for a four-wheel drive vehicle operable for permitting a vehicle operator to select between various full-time and part-time four-wheel drive modes. The power transfer system includes a transfer case equipped with a single-planetary gear reduction unit and a synchronized range shift mechanism operable for permitting the vehicle operator to shift on-the-fly for establishing full-time and part-time high-range and low-range four-wheel drive modes. The transfer case is also equipped with an electronically-controlled slip limiting/torque biasing arrangement including an interaxle differential and a transfer clutch operable for controlling the magnitude of speed differentiation and torque biasing across the interaxle differential.

17 Claims, 7 Drawing Sheets

FULL-TIME TRANSFER CASE WITH SYNCHRONIZED SINGLE PLANETARY GEAR REDUCTION UNIT

BACKGROUND OF THE INVENTION

The present invention relates to a power transfer system for controlling the distribution of drive torque between the front and rear wheels of a four-wheel drive vehicle as a function of various system and operator-initiated inputs.

Due to increased consumer demand for four-wheel drive vehicles, a plethora of different power transfer systems are currently utilized for directing power (i.e., drive torque) to all four wheels of the vehicle. For example, in many "part-time" power transfer systems, a transfer case is incorporated into the driveline and is normally operable in a two-wheel drive mode for delivering drive torque to the driven wheels. When four-wheel drive is desired, a "mode" shift mechanism can be selectively actuated by the vehicle operator for directly coupling the non-driven wheels to the driven wheels for establishing a part-time four-wheel drive mode. As will be appreciated, motor vehicles equipped with such a part-time power transfer systems offer the vehicle operator the option of selectively shifting between the two-wheel drive mode during normal road conditions and the part-time four-wheel drive mode for operation under adverse road conditions. An example of a part-time transfer case is disclosed in commonly-owned U.S. Pat. No. 4,770,280 to Frost.

Alternatively, it is known to use "on-demand" power transfer systems for automatically directing power to the non-driven wheels, without any input or action on the part of the vehicle operator, when traction is lost at the driven wheels. Modernly, the "on-demand" feature is incorporated into the transfer case by replacing the mode shift mechanism with a clutch assembly that is interactively associated with an electronic control system and a sensor arrangement. During normal road conditions, the clutch assembly is maintained in a non-actuated condition such that drive torque is only delivered to the driven wheels. However, when the sensors detect a low traction condition at the driven wheels, the clutch assembly is automatically actuated to deliver drive torque "on-demand" to the non-driven wheels. Moreover, the amount of drive torque transferred through the clutch assembly to the non-driven wheels can be varied as a function of specific vehicle dynamics, as detected by the sensor arrangement. One example of such an "on-demand" power transfer system is disclosed in commonly-owned U.S. Pat. No. 5,323,871 to Wilson et al wherein the electronically-controlled clutch assembly is operable for automatically controlling the amount of drive torque transferred to the non-driven wheels as a function of the wheel speed difference (i.e., the wheel slip) between the driven and non-driven wheels.

As a further alternative, some vehicles are equipped with full-time power transfer system having a transfer case equipped with a center differential that functions to permit interaxle speed differentiation while transferring drive torque to both of the front and rear drivelines. To minimize loss of traction due to wheel slippage, full-time transfer cases are typically equipped with a slip limiting device locking the center differential to prevent speed differentiation and, in effect, establishing a part-time four-wheel drive mode. Examples of manually-actuated differential lock-up arrangements are disclosed in commonly-owned U.S. Pat. No. 3,848,691 to Dolan and U.S. Pat. No. 4,677,873 to Eastman. An automatic differential lock-up arrangement is disclosed in commonly-owned U.S. Pat. No. 3,845,671 to Sharp et al. wherein an electrically-controlled clutch assembly is actuated to lock-up the center differential when speed differentiation due to a wheel slip condition is detected as exceeding a predetermined value. In addition, torque-biasing differential lock-up arrangements are disclosed in commonly-owned U.S. Pat. No. 4,031,780 to Dolan et al. and U.S. Pat. No. 5,046,998 to Frost, which both utilize a viscous coupling to progressively modify the torque distribution in proportion to the magnitude of the speed differentiation across the center differential. Finally, electronically-controlled full-time transfer cases are disclosed in U.S. Pat. No. 4,718,303 to Fogelberg and U.S. Pat. No. 4,860,612 to Dick et al. wherein an electromagnetic biasing clutch is provided across the center differential to controllably bias the torque delivered to the front and rear drivelines in response to wheel slip.

To accommodate differing road surfaces and conditions, many of the above-referenced transfer cases are equipped with a gear reduction unit for providing high-range (i.e., direct drive) and low-range (i.e., reduced ratio drive) speed ratios in conjunction with the various four-wheel drive modes. Most commonly, the gear reduction units used in such dual-speed transfer cases include either a layshaft arrangement or a planetary gear assembly. However, in most current four-wheel drive vehicles, the transfer case can only be shifted between the four-wheel low-range drive mode and the four-wheel high-range drive mode when the motor vehicle is in a substantially non-motive condition. Unfortunately, the need to stop the vehicle prior to shifting between the available four-wheel drive speed ranges is inconvenient, particularly upon encountering road conditions or surface terrain where continuation of the vehicle's rolling momentum would assist in overcoming the conditions encountered. As such, gear reduction units have been designed which permit the vehicle operator to shift "on-the-fly" from the four-wheel low-range drive mode into the four-wheel high-range drive mode without stopping the vehicle. For example, U.S. Pat. No. 5,054,335 to Andrews discloses a transfer case having a synchronized shift arrangement for a layshaft-type gear reduction unit while commonly-owned U.S. Pat. No. 5,346,442 to Eastman discloses a transfer case having a synchronized shift arrangement for a planetary-type gear reduction unit. However, while both designs advance the art, the need still exists to develop a gear reduction unit that can also be shifted "on-the-fly" from the four-wheel high-range drive mode into the four-wheel low-range drive mode. In view of the fact that most modern dual-speed transfer cases are equipped with planetary-type gear reduction units, a particular need exists to develop a synchronized shift arrangement for such transfer cases to permit the vehicle operator to shift "on-the-fly" between both available four-wheel drive speed ranges.

SUMMARY OF THE INVENTION

It is therefore an object of the present invention to provide an improved power transfer system for use in four-wheel drive vehicles having a transfer case equipped with a clutch assembly for controlling the torque delivered to the front and rear wheels in response to changing vehicle conditions.

According to a preferred embodiment, the power transfer system of the present invention is operable for establishing a full-time four-wheel drive mode and includes a transfer case having a clutch assembly arranged to control speed differentiation and torque biasing across an interaxle differential, sensors for detecting and generating input signals indicative of various dynamic and operational characteristics of the vehicle, and a controller for controlling actuation of the clutch assembly in response to the sensor input signals. Under normal road and tractive conditions, the clutch assembly is maintained in a non-actuated condition. However, upon the occurrence of traction loss, the clutch assembly is automatically actuated for limiting interaxle slip while transferring increased drive torque to the non-slipping wheels. Under a preferred control scheme, the actuated condition of the clutch assembly is controllably varied between its non-actuated and fully-actuated limits as a function of the sensor input signals for automatically varying the speed differentiation and torque biasing across the interaxle differential in response to changes in the dynamic and operational characteristics of the vehicle.

The power transfer system may further include means for establishing a part-time four-wheel drive mode in addition to the full-time four-wheel drive mode. To this end, a mode select mechanism is provided for permitting the vehicle operator to select one of the full-time and part-time four-wheel drive modes and generate a mode signal indicative thereof. The mode signal is delivered to the controller for use in controlling actuation of the clutch assembly. When the part-time four-wheel drive mode is selected, the clutch assembly is fully-actuated for preventing speed differentiation across the interaxle differential and thereby delivering non-differentiated drive torque to the front and rear drivelines. When the full-time four-wheel drive mode is selected, the actuated condition of the clutch assembly is controllably varied between its non-actuated and fully-actuated limits in response to the sensor input signals for automatically varying speed differentiation and torque biasing across the interaxle differential. Thus, the power transfer system of the present invention offers the vehicle operator the option of selecting the specific four-wheel drive mode best-suited for operating the motor vehicle during normal or adverse road conditions as well as for off-road use.

As a further feature of the present invention, the transfer case is equipped with a gear reduction unit and a synchronized range shift mechanism that permit "on-the-fly" shifting between a four-wheel high-range drive mode and a four-wheel low-range drive mode. Accordingly, the synchronized range shift mechanism permits the vehicle operator to shift the transfer case between the various full-time and part-time four-wheel high-range and low-range drive modes without stopping the vehicle.

A further object of the present invention is to supply one or more "operator-initiated" input signals to the controller for further controlling automatic operation of the power transfer system in response thereto. Preferably, the operator-initiated input signals are indicative of the position of a movable control element (i.e., accelerator pedal, throttle position, steering wheel, brake pedal, etc.) and are used, in conjunction with the sensor input signals, for optimizing the torque biasing across the interaxle differential.

BRIEF DESCRIPTION OF THE DRAWINGS

Further objects, features and advantages of the present invention will become apparent to those skilled in the art from analysis of the following written description, the accompanying drawings and the appended claims in which:

DETAILED DESCRIPTION OF THE INVENTION

Figure 1:
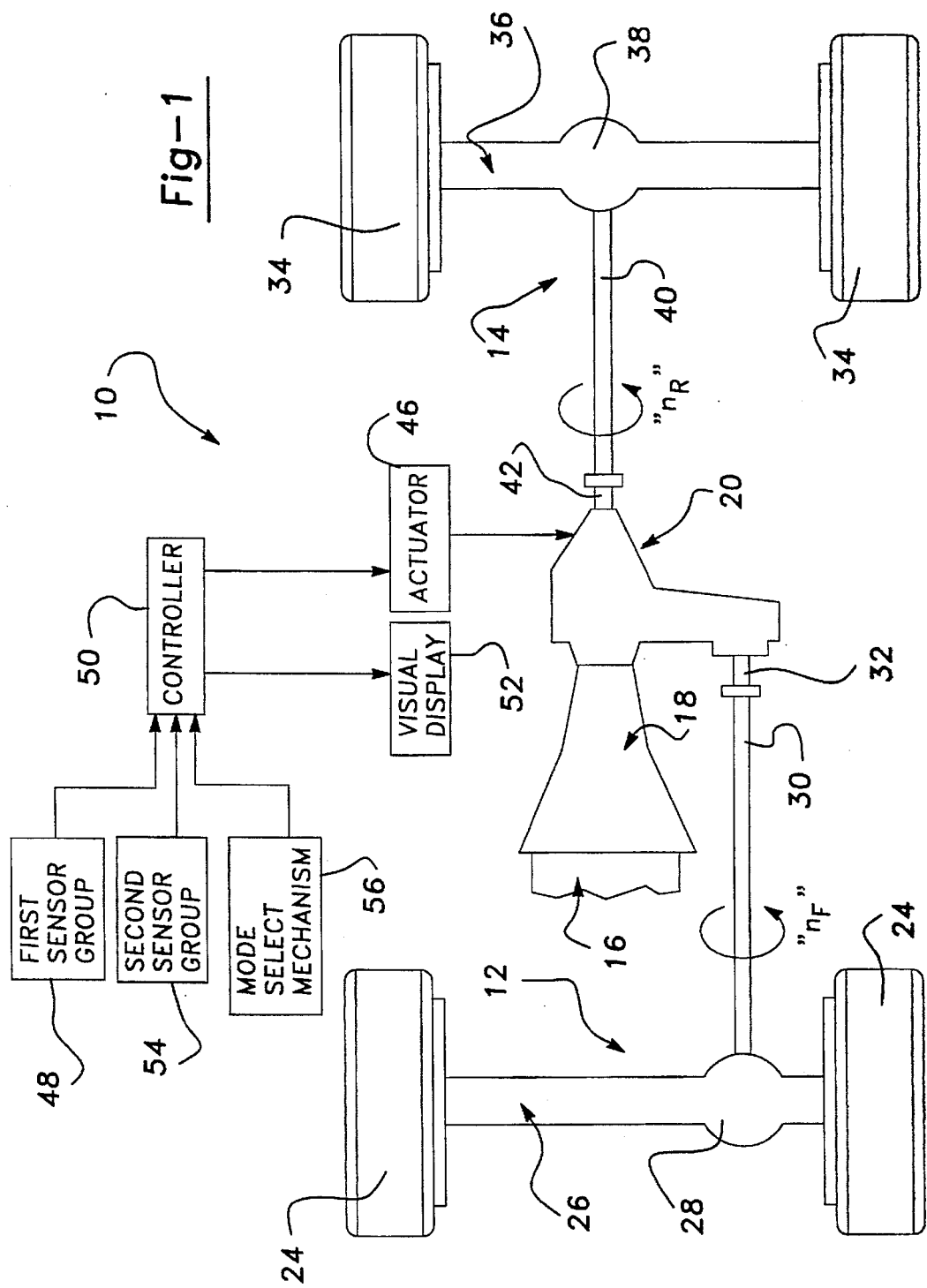
FIG. 1 is a schematic representation of a four-wheel drive motor vehicle, equipped with the power transfer system of the present invention.

According to the presently preferred embodiment of the present invention, a power transfer system is disclosed for a four-wheel drive vehicle which includes means for permitting a vehicle operator to select between a full-time four-wheel drive mode and a part-time four-wheel drive mode. In addition, the power transfer system includes a synchronized range shift mechanism for use with a planetary gear reduction unit that is operable for providing four-wheel low-range and high-range drive modes. Thus, the power transfer system of the present invention is adapted to permit the vehicle operator to shift "on-the-fly" between the various available full-time and part-time high-range and low-range four-wheel drive modes.

Referring now to the drawings, a drivetrain for a four-wheel drive vehicle is schematically shown interactively associated with a power transfer system 10 of the present invention. The motor vehicle drivetrain includes a front driveline 12 and a rear driveline 14 both drivable from a source of power, such as an engine 16, through a transmission 18 which may be of either the manual or automatic type. In the particular embodiment shown, the drivetrain is an all-wheel drive system which incorporates a transfer case 20 for transmitting drive torque from engine 16 and transmission 18 to front driveline 12 and rear driveline 14. Front driveline 12 includes a pair of front wheels 24 connected at opposite ends of a front axle, assembly 26 having a front differential 28 that is coupled to one end of a front drive shaft 30, the opposite end of which is coupled to a front output shaft 32 of transfer case 20. Similarly, rear driveline 14 includes a pair of rear wheels 34 connected at opposite ends of a rear axle assembly 36 having a rear differential 38 coupled to one end of a rear drive shaft 40, the opposite end of which is interconnected to a rear output shaft 42 of transfer case 20. As will be detailed hereinafter with greater specificity, transfer case 20 is equipped with an electronically-controlled "slip limiting/torque-biasing"

arrangement including an interaxle (i.e., center) differential 22 operably interconnecting front output shaft 32 and rear output shaft 42 and a transfer clutch 44 that is operable to control the magnitude of speed differentiation and modify the torque distribution ratio across center differential 22.

Power transfer system 10 further includes an actuator 46 for actuating transfer clutch 44, a first sensor group 48 for sensing specific dynamic and operational characteristics of the motor vehicle and generating sensor input signals indicative thereof, and a controller 50 for generating a control signal in response to the sensor input signals. Moreover, controller 50 is adapted to control the actuated condition of transfer clutch 44 by sending the control signal to actuator 46. As is schematically shown, controller 50 is also operable for illuminating a visual display 52 located within the passenger compartment for providing the vehicle operator with a visual indication of the operational status of power transfer system 10. Power transfer system 10 can optionally include a second sensor group 54 for generating one of more "operator-initiated" input signals that are indicative of the position movable control elements under the control of the vehicle operator. The operator-initiated input signals are used for establishing control characteristics which, in combined with the sensor input signals, are used to generate control signals to further regulate the torque distribution across transfer clutch 44.

Power transfer system 10 also includes a mode select mechanism 56 for permitting the vehicle operator to select one of the available full-time or part-time four-wheel drive modes. In particular, controller 50 controls actuator 46 in response to a mode signal sent to controller 50 from mode select mechanism 56 that is indicative of the particular mode selected. When the full-time four-wheel drive mode is selected, controller 50 operates to continuously monitor and automatically regulate the actuated condition of transfer clutch 44 between its non-actuated and fully-actuated limits for varying the magnitude of speed differentiation and drive torque transmitted across center differential 22. Preferably, controller 50 functions to control actuation of transfer clutch 44 so as to increase the drive torque delivered to the slower turning output shaft while concurrently decreasing the drive torque delivered to the faster turning output shaft in an amount equal to the torque capacity of transfer clutch 44 at a given actuated state. However, when the mode signal indicates that the part-time four-wheel drive mode has been selected, transfer clutch 44 is fully actuated to maintain center differential 22 in a "locked-up" condition, whereby non-differentiated power is delivered to output shafts 32 and 42. The part-time four-wheel drive mode is provided for permitting improved traction when the motor vehicle is operated off-road or on severe road conditions.

Figure 2:
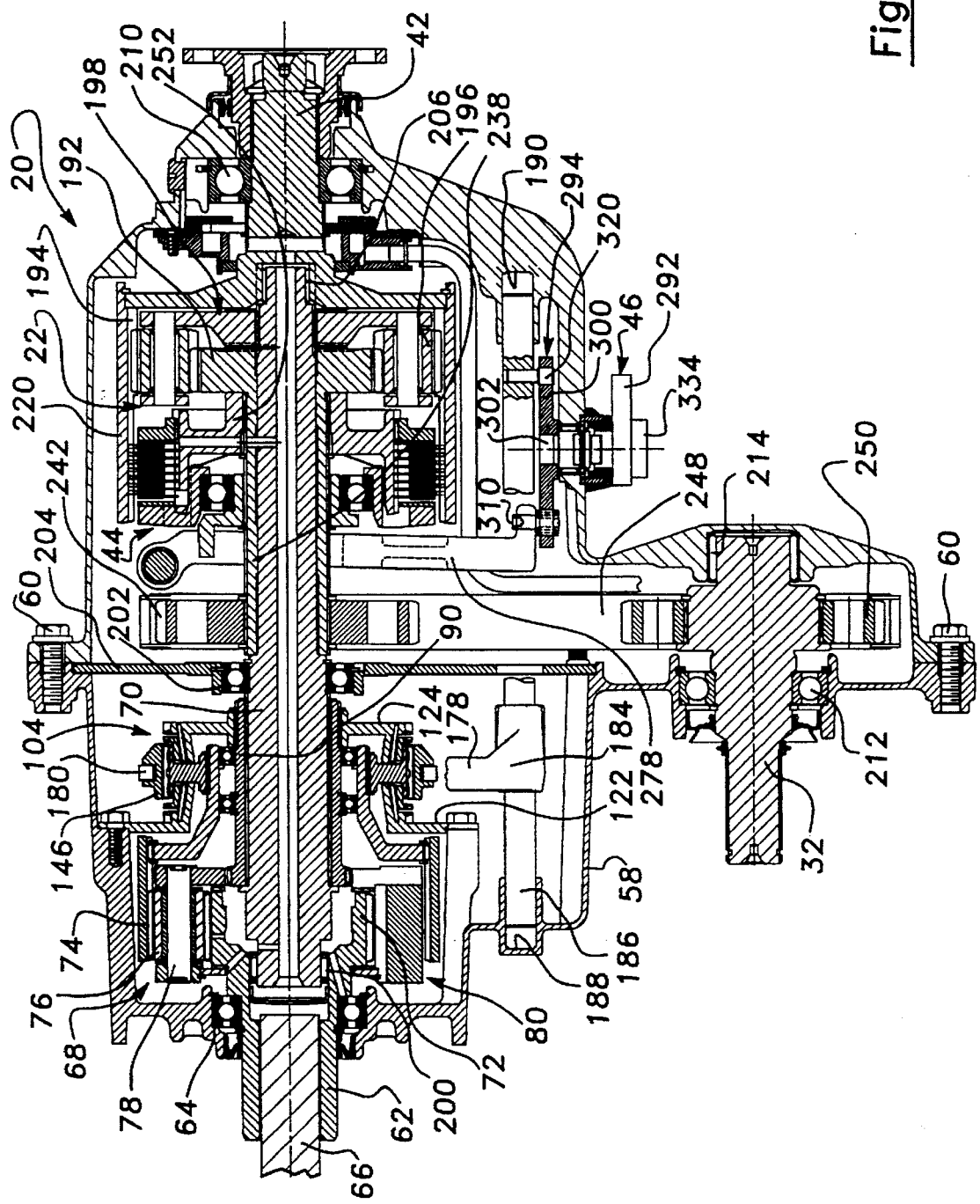
FIG. 2 is a cross-sectional view of a transfer case constructed according to a preferred embodiment of the present invention and which includes a planetary gear reduction unit, a synchronized range shift mechanism, an interaxle differential, a clutch assembly, a drive mechanism, and an electrically-controlled actuator.
Figure 3:
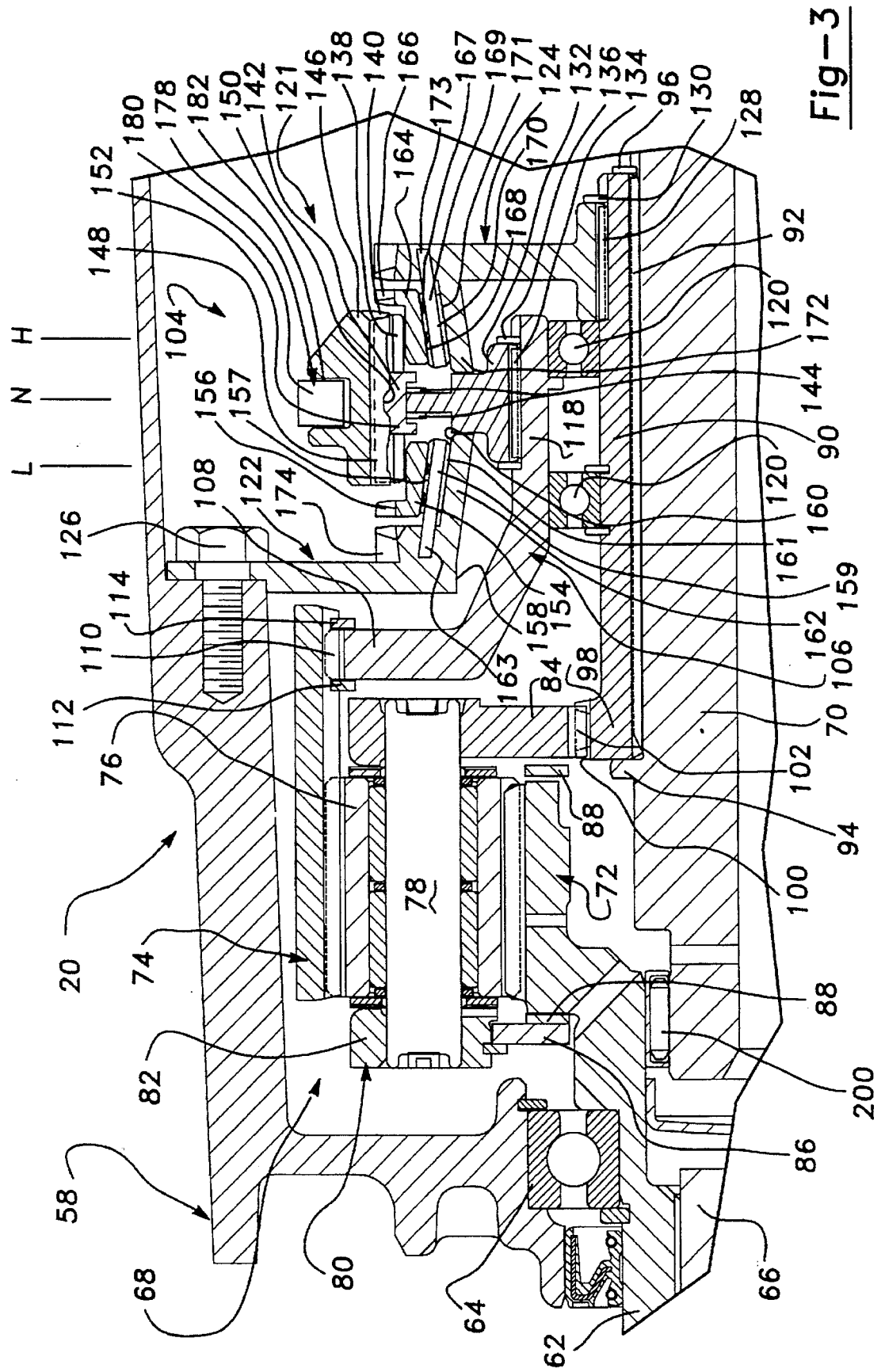
FIG. 3 is an enlarged partial view of FIG. 2 showing the planetary gear reduction unit and synchronized range shift arrangement in greater detail.
Figure 4:
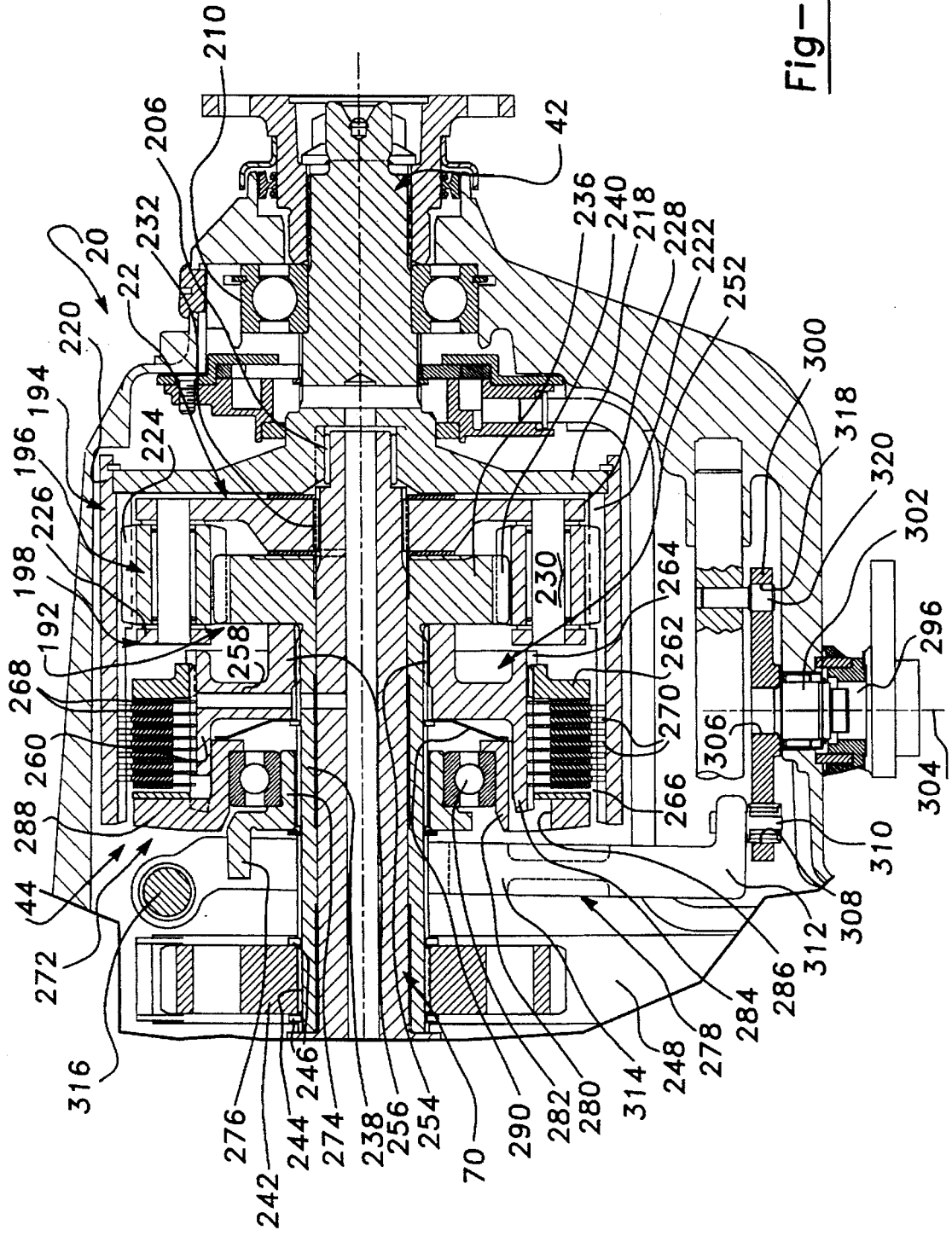
FIG. 4 is also an enlarged partial view of FIG. 2 showing various components of the interaxle differential and clutch assembly in greater detail.

With particular reference now to FIGS. 2 through 4, a preferred construction for transfer case 20 will now be described. Transfer case 20 is shown to include a housing 58 formed by a series of modular sections which are suitably interconnected by a plurality of threaded fasteners 60. An input shaft 62 is shown rotatably supported in housing 58 via a bearing assembly 64. A transmission output shaft, partially shown at 66, is coupled (i.e., splined) to input shaft 62 such that both are rotatably driven by engine 16 of the motor vehicle. A planetary-type gear reduction unit, hereinafter planetary gear assembly 68, is operably installed between input shaft 62 and a mainshaft 70. As will be detailed, planetary gear assembly 68 is operable in a "high-range" drive mode for driving mainshaft 70 at a direct speed ratio (i.e., 1:1) relative to input shaft 62. Planetary gear assembly 68 is also operable in a "low-range" drive mode for driving mainshaft 70 at a reduced speed ratio (i.e., 0.37:1) relative to input shaft 62. Finally, planetary gear assembly 68 is operable in a "Neutral" non-driven mode for interrupting the transfer of drive torque from input shaft 62 to mainshaft 70.

Planetary gear assembly 68 includes a sun gear 72 integrally formed on input shaft 62, a ring gear 74, and a plurality of pinion gears 76 (one shown) in meshed engagement with sun gear 72 and ring gear 74. Each pinion gear 76 is rotatably journalled on a pinion shaft 78 having its opposite end supported in a planet carrier 80. Preferably, planet carrier 80 is constructed to include fore and aft carrier rings 82 and 84, respectively, secured together by suitable fasteners (not shown). A locator disk 86 is secured to carrier ring 82 for rotation with planet carrier 80. While not critical to the present invention, it is preferable that the type of gears associated with planetary gear assembly 68 be of the helical type. That is, sun gear 72, pinion gears 76, and ring gear 74 are all formed to have helical teeth. To contain the axial loads generated due to the helical gear teeth, and facilitate relative rotation between sun gear 72 and pinion gears 76, thrust washers 88 are located between the laterally-spaced radial edge surfaces of sun gear 72 and the facing inner surfaces of locator disk 86 and aft carrier ring 84. In this manner, planet carrier 80 is axially restrained by sun gear 72 while being free to float radially for negating or substantially minimizing unbalanced torque loading thereon.

To provide means for transferring drive torque from planetary gear assembly 68 to mainshaft 70, aft carrier ring 84 is shown coupled to a tubular quill shaft 90 that, in turn, is fixed via splined connection 92 for rotation with mainshaft 70. The axial location of quill shaft 90 on mainshaft 70 is maintained by a radial locator flange 94 and a snap ring 96. As shown, a gear hub 98 is formed at the forward end of quill shaft 90 which has its external teeth 100 meshed with internal teeth 102 on aft carrier ring 84. In addition, a synchronized range shift mechanism 104 is provided in conjunction with planetary gear assembly 68 and is operable for permitting transfer case 20 to be shifted "on-the-fly" between a four-wheel low-range drive mode and a four-wheel high-range drive mode. In particular, synchronized range shift mechanism 104 includes a bell-shaped reaction member 106 having a radial plate segment 108 fixed via a splined connection 110 to ring gear 74 for rotation therewith. A thrust washer 112 and a snap ring 114 locate plate segment 108 relative to planet carrier 80. Reaction member 106 also includes a tubular segment 118 which is supported on quill shaft 90 by a pair of bearing assemblies 120. Thus, reaction member 106 is supported for relative rotation with respect to mainshaft 70.

As best seen from FIG. 3, range shift mechanism 104 includes a bi-directional synchronizer clutch apparatus 121 that is operably associated with reaction member 106 for selectively coupling ring gear 74 to either a brake plate 122 or a direct-drive hub 124. Brake plate 122 is shown fixed to housing 58 via bolts 126 while direct-drive hub 124 is shown fixed via a splined connection 128 to quill shaft 90 with a retainer ring 130 axially locating direct-drive hub 124 thereon. Synchronizer clutch apparatus 121 includes a hub 132 that is fixed via a splined connection 134 to tubular segment 118 of reaction member 106 and is axially retained thereon via a snap ring 136. Hub 132 has an outer cylindrical rim 138 on which external longitudinal splines 140 are formed. Synchronizer clutch apparatus 21 also includes a plurality of struts 142 (one shown), each being retained in one of a series of circumferentially-spaced cutouts formed in outer cylindrical rim 138 of hub 132. Struts 142 are biased in a radially outward direction by a pair of energizing springs 144. Synchronizer clutch apparatus 121 also includes a range sleeve 146 having internal longitudinal splines 148 that mesh with external splines 140 on hub 132. Thus, range sleeve 146 is supported for rotation with ring gear 74 as well as for axial sliding movement on hub 132. Splines 148 include a central detent groove 150 that is provided for centering range sleeve 146 on humps 152 of struts 142 so as to define a centered "Neutral" position (designated by position line "N"). Furthermore, synchronizer clutch apparatus 121 includes a first blocker ring 154 having raised blocker teeth 156 and a frusto-conical surface 158 that is supported for limited axial and rotational movement on an upper frusto-conical surface 157 of a reaction ring 159, its lower frusto-conical surface 161 retained on a frusto-conical surface 160 formed on an annular flange segment 162 of brake plate 122. Axial tangs 163 on reaction ring 159 are nested against a hub portion of brake plate 122. A second blocker ring 164 having raised blocker teeth 166 and a frusto-conical surface 168 is supported on an upper frusto-conical surface 167 of a reaction ring 169, its lower frusto-conical surface 171 retained on a frusto-conical surface 170 formed on an annular flange segment 172 of direct-drive hub 124. Axial tangs 173 on reaction ring 169 are nested against direct drive hub 124. Blocker rings 154 and 164 are rotatably restrained by rim portion 138 of hub 132 such that movement of range sleeve 146 in either direction from the centered Neutral position shown causes struts 142 to act thereon for generating a synchronizing cone torque.

When it is desired to establish the low-range drive connection between input shaft 62 and mainshaft 70, range sleeve 146 is moved toward brake plate 122. Such movement causes struts 142 to act on blocker ring 154 which, in turn, causes its blocker teeth 156 to be rotatably indexed out of alignment with range sleeve, splines 140, thereby preventing further axial movement of range sleeve 146 until speed synchronization between brake plate 122 and ring gear 74 is established. Once speed synchronization is complete, splines 148 on range sleeve 146 are permitted to move through blocker teeth 156 and into a position of meshed engagement with clutch teeth 174 on brake plate 122. In this position, as denoted by position line "L" in FIG. 3, the low-range drive connection is established between input shaft 62 and mainshaft 70. Such speed synchronization between ring gear 74 and brake plate 122 results in ring gear 74 being stopped or "braked" prior to movement of range sleeve 146 through blocker teeth 156. Since ring gear 74 is held stationary, rotation of input shaft 62 causes planet carrier 80 to be rotatably driven at the reduced speed ratio which, in turn, drives quill shaft 90 and mainshaft 70 at the reduced speed ratio.

When it is desired to establish the high-range drive connection between input shaft 62 and mainshaft 70, range sleeve 146 is moved toward direct-drive hub 124. Such movement causes struts 142 to act on blocker ring 164 which, in turn, causes blocker teeth 166 to index and prevent further movement of range sleeve 146 until speed synchronization is established between ring gear 74 and planet carrier 80. Upon completion of speed synchronization, spline teeth 148 of range sleeve 146 are permitted to pass through blocker teeth 166 and into a position of meshed engagement with clutch teeth 176 on direct-drive hub 124. As such, sun gear 72, ring gear 74 and pinion gears 76 are effectively locked together to rotate as a common unit. Thus, in this position, as denoted by position line "H" in FIG. 3, the high-range drive connection is established between input shaft 62 and mainshaft 70. Finally, when it is desired to shift transfer case 20 into its Neutral mode, range sleeve 146 is moved to its ("N") position. In this position, ring gear 74 is uncoupled from both brake plate 122 and direct-drive member 124. As such, rotation of input shaft 62 and sun gear 72 causes planet gears 76 to rotate about their respective pinion shafts 78 which, in turn, causes ring gear 74 to be rotatably driven. As a result, planet carrier 80 is not rotatably driven in response to rotation of sun gear 72, whereby quill shaft 90 and mainshaft 70 are also maintained in a non-driven state.

To provide means for moving range sleeve 146 between its three distinct positions, synchronized range shift mechanism 104 further includes a range fork 178 having projections 180 that are retained in a groove 182 formed in range sleeve 146. Range fork 178 also includes a tubular segment 184 that is fixedly connected to a shift rail 186, the opposite ends of which are supported in sockets 188 and 190 formed in housing 58 for sliding movement relative thereto. As will be described, transfer case 20 includes means for causing axial movement of shift rail 186 and, in turn, range sleeve 146 between the three above-noted positions in response to actuation of actuator 46.

With particular reference now to FIGS. 2 and 4, the various components associated with the slip limiting/torque-biasing arrangement in transfer case 20 will now be described. Specifically, center differential 22 is provided for mechanically coupling mainshaft 70 to front driveshaft 30 and rear driveshaft 40 to permit speed differentiation and distribute drive torque therebetween. While any suitable differential unit is contemplated for use with transfer case 20, center differential 22 is disclosed as a single planetary gearset having a sun gear 192 connected for rotation with front output shaft 32, a ring gear 194 coupled for rotation with rear output shaft 42, and a plurality of pinion gears 196 carried by a planet carrier 198 that is coupled for rotation with mainshaft 70. Moreover, each pinion gear 196 intermeshes with both sun gear 192 and ring gear 194. As seen, mainshaft 70 is coupled to the output of range shift mechanism 104 via its direct connection to quill shaft 90. Thus, driven rotation of mainshaft 70 causes center differential 22 to drive front and rear output shafts 32 and 42, respectively, at a predetermined speed ratio with respect to one another. As is known, the torque distribution (i.e., the torque split) normally delivered across center differential 22 to output shafts 32 and 42 is a ratio determined by the particular gear geometry associated with the intermeshed gear components.

With continued reference to FIGS. 2 through 4, mainshaft 70 is shown to have its forward end rotatably supported by a bearing assembly 200 mounted in a piloted bore in input shaft 62, its intermediate portion rotatably supported by a bearing assembly 202 mounted in a bearing plate 204, and its rearward end rotatably supported by a bearing assembly 206 mounted in a piloted bore in rear output shaft 42. Similarly, rear output shaft 42 is rotatably supported in housing 58 by a bearing assembly 210 and front output shaft 32 is rotatably supported in housing 58 via bearing assemblies 212 and 214. Rear output shaft 42 is shown to include a radially-extending plate segment 218 that is fixedly secured to one end of a cylindrical outer drum 220. Ring gear 194 is defined by a set of gear teeth 222 formed on the inner peripheral surface of a outer drum 220. Gear teeth 222 are shown to be in constant mesh with gear teeth 224 of pinion gears 194. As is also shown, planet carrier 198 includes a pair of carrier rings 226 and 228 between which pinion gears 196 are journally supported for rotation on pins 230. Carrier ring 226 is fixed via a splined connection 232 to mainshaft 70. Sun gear 192 is journally supported on an intermediate portion of mainshaft 70 for relative rotation with respect thereto and is integrally formed to include a gear hub 236 and an elongated shaft sleeve 238. Gear hub 236 has external gear teeth 240 formed thereon which are in constant meshed engagement with gear teeth 224 of pinion gears 196. A drive sprocket 242 is shown fixed via a splined connection 244 to shaft sleeve 238 of sun gear 192 with a pair of retaining rings 246 provided for maintaining its axial alignment with respect thereto. Drive sprocket 242 drivingly engages a chain 248 coupled to a driven sprocket 250 which is coupled to, or an integral portion of, front output shaft 32. Thus, in the embodiment disclosed, planet carrier 198 is the input member of center differential 22 while sun gear 192 and ring gear 194 are its front and rear output members, respectively.

Transfer clutch 44 is installed within transfer case 20 for controlling speed differentiation and the resulting torque distribution between ring gear 194 and sun gear 192 of center differential 22. Transfer clutch 44 is a multi-plate friction clutch assembly and includes an inner drum 252 that is fixed via a splined connection 254 to shaft sleeve 238 for rotation with sun gear 192. In particular, inner drum 252 is formed to include an annular hub segment 256 splined to shaft sleeve 238, a web segment 258 extending radially from hub segment 256, and a cylindrical rim segment 260 formed at the opposite end of web segment 258 which extends coaxially to hub segment 256. Pressure plate 262 is splined for rotation with inner drum 252 and abuts radial flange stop 264 formed thereon. Outer drum 220 is shown to surround inner drum 252 so as to form an internal chamber 266 therebetween. Disposed within internal chamber 266 are two sets of alternately interleaved friction clutch plates that can be frictionally compressed for limiting speed differentiation and biasing the torque distribution between sun gear 192 and ring gear 194 of center differential 22. In particular, a set of inner clutch plates 268 are mounted (i.e., splined) to rim segment 260 of inner drum 252 for rotation with sun gear 192. Likewise, a set of outer clutch plates 270 are mounted (i.e., splined) to outer drum 220 for rotation with ring gear 194. The interleaved clutch plates are supported for axial sliding movement to establish frictional contact between.

With continued reference to FIGS. 2 and 4, transfer clutch 44 is shown to include a thrust mechanism 272 supported for axial sliding movement on shaft sleeve 238 and which is operable for frictionally compressing the interleaved clutch plates as a function of the clutch engagement force exerted thereon. Thrust mechanism 272 includes an annular inner bearing support 274 journally supported for sliding non-rotatable movement on shaft sleeve 238. To this end, inner bearing support 274 includes one or more axial flanges 276 that are nested within a corresponding aperture formed in a pivotable lever arm 278 for inhibiting rotation of inner bearing support 274. Thrust mechanism 272 also includes an annular outer bearing support 280 that is coupled for rotation with inner drum 252 and a bearing assembly 282 retained between inner bearing support 274 and outer bearing support 280. As seen, axial lugs 284 formed on the distal end of rim segment 260 are nested within apertures 286 in outer bearing support 280. Thus, outer bearing support 280 is supported for rotation with inner drum 252 and ring gear 194 while inner bearing support 274 is held stationary relative thereto. Buttons (not shown), are mounted on lever arm 278 and are adapted to engage inner bearing support 274 for causing sliding movement of thrust mechanism 272 in response to pivotal movement of lever arm 278. Such axial sliding movement of thrust mechanism 272 causes a clutch engagement force to be exerted by an apply plate segment 288 of outer bearing support 280 on the interleaved clutch plates.

An annular return spring 290 is retained between inner drum 252 and outer bearing support 280 for normally biasing thrust mechanism 272 in a direction away from the clutch plates.

Preferably, actuator 46 is a rotary actuator 292, such as an electric gearmotor, which is operable for generating an output torque, the value of which varies as a function of the magnitude of the electrical control signal applied thereto by controller 50. To provide means for selectively controlling the magnitude of the clutch engagement force exerted on thrust mechanism 272, rotary actuator 292 is connected to a drive mechanism 294. Drive mechanism 294 is interconnected to an rotary output member 296 of rotary actuator 292 for changing its output torque, into an axially-directed force used for controlling the clutch engagement force applied by lever arm 278 on thrust mechanism 272 of transfer clutch 44 as well as for controlling axial movement of range sleeve 146. In particular, drive mechanism 294 includes a sector plate 300 that is rotatably driven through a range of angular motion by output member 296 of rotary actuator 292. As will be detailed, sector plate 300 is operable for causing coordinated movement of range sleeve 146 between its three distinct range positions and controlling the magnitude of the clutch engagement force exerted on thrust mechanism 272 by lever arm 278 so as to establish the various drive modes that are available. An actuator shaft 302, supported from transfer case housing 58 for rotation about an axis 304, has one end secured in an aperture 306 formed in sector plate 300 with its opposite end coupled to output member 296 of rotary actuator 292.

To generate the desired clutch engagement force, sector plate 300 includes a mode slot 308 within which a crowned roller 310 is retained. Crowned roller 310 is fixed to a flange section 312 of lever arm 278. Lever arm 278 also includes a generally Y-shaped or forked section 314 which is bifurcated to surround mainshaft 70. The bifurcated ends of forked section 314 are retained for pivotal movement on a transverse rail 316, the ends of which are retained in suitable sockets (not shown) formed in housing 58. The contour of mode slot 308 is configured to cause controlled pivotal movement of lever arm 278 in response to rotation of sector plate 300 for generating the clutch engagement force exerted on thrust mechanism 272 of transfer clutch 44. To control axial movement of range sleeve 146, sector plate 300 also has a range slot 318 within which a range pin 320 extends. Range pin 320 is fixed to shift rail 186. As such, the contour of range slot 318 is configured to cause controlled axial movement of shift rail 186 and, in turn, range fork 178 and range sleeve 142 in response to controlled rotation of sector plate 300.

Figure 5:
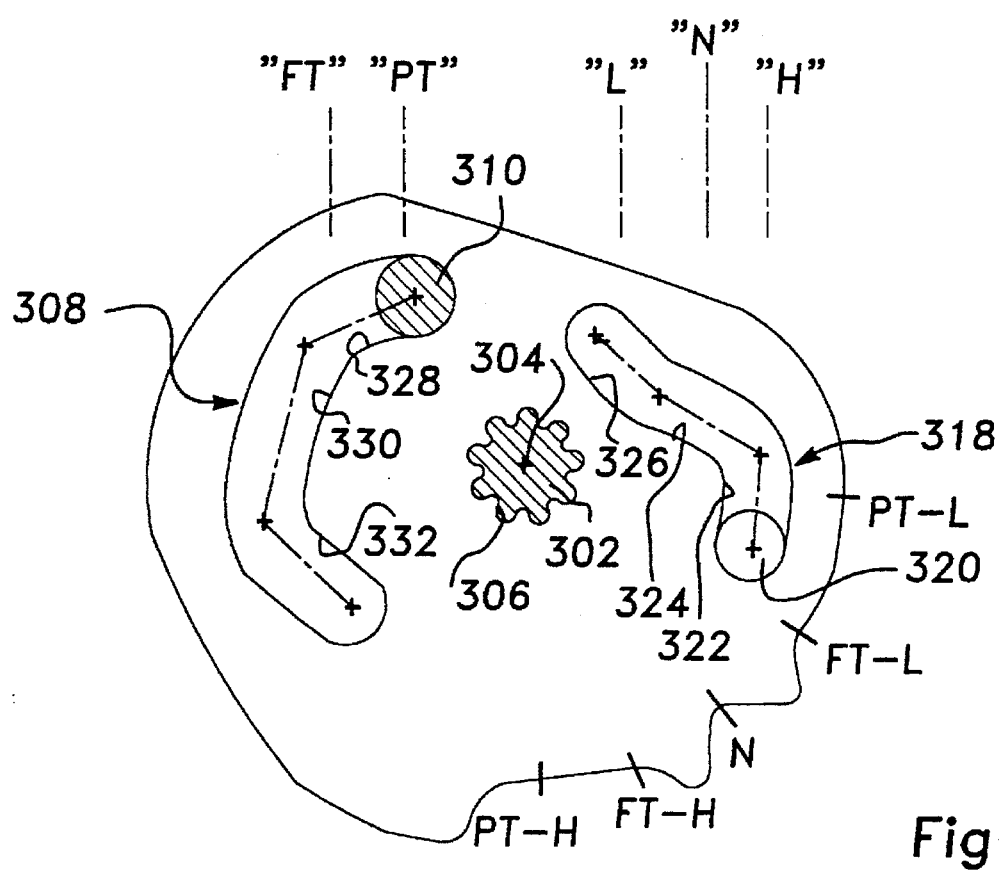
FIG. 5 is a side view of a sector plate associated with the drive mechanism for controlling coordinated actuation of the synchronized range shift mechanism and the clutch assembly.

From FIGS. 4 and 5, it can be seen that sector plate 300 may be rotated about axis 304 by actuator shaft 302 to any one of five distinct sector positions, as labelled "PT-H", "FT-H", "N", "FT-L", and "PT-L". As will be detailed, transfer case 20 is operable for establishing at least five distinct operative modes, namely, a part-time four-wheel high-range drive mode, a full-time four-wheel high-range drive mode, a Neutral non-driven mode, a full-time four-wheel low-range drive mode, and a part-time four-wheel low-range drive mode. The particular operational mode selected is established by the position of crowned roller 310 in mode slot 308 and the position of range pin 320 in range slot 318 in response to angular position of sector plate 300. In operation, the vehicle operator selects a desired operative drive mode via mode select mechanism 56 which, in turn, signals controller 50 of the selection. Thereafter, controller 50 generates an electric control signal that is applied to rotary actuator 292 for controlling the rotated position of sector plate 300. More particularly, upon selection of the part-time four-wheel high-range drive mode, the Neutral mode or the part-time four-wheel low-range drive mode, sector plate 300 is controllably rotated to each mode's predefined sector position, namely PT-H, N, or PT-L. However, when the full-time four-wheel high-range and low-range drive modes are selected, power transfer system 10 is operable for modulating the clutch engagement force applied to transfer clutch 44 as a function of the various sensor and operator-initiated input signals. Mode select mechanism 56 can take the form of any mode selector device which is under the control of the vehicle operator for generating a mode signal indicative of the specific mode selected. In one form, the mode selector device may be an array of dash-mounted push button switches. Alternatively, the mode selector device may be a manually-operable shift lever sequentially movable between a plurality positions corresponding to the available operational modes which, in conjunction with a suitable electrical switch arrangement, generates a mode signal indicating the mode selected. In either form, mode select mechanism 56 offers the vehicle operator the option of deliberately choosing between the various operative drive modes.

With particular reference to FIG. 5, the contour of range slot 318 and mode slot 308 are defined in greater detail. In particular, the contour of range slot 318 is defined by first, second and third cam pathways 322, 324 and 326, respectively, which respectively correspond to fourth, fifth and sixth cam pathways 328, 330 and 332, respectively, associated with mode slot 308. In the PT-H sector position shown, crowned roller 310 is positioned within mode slot 308 in close proximity to the terminal end of fourth cam pathway 328 for establishing a part-time (PT) position. With crowned roller 310 in this (PT) position, lever arm 278 is pivoted toward transfer clutch 44 so as to exert the maximum clutch engagement force on thrust mechanism 272 for frictionally compressing the interleaved clutch plates such that transfer clutch 44 is considered to be operating in a fully-actuated (i.e., locked-up) condition. In addition, range pin 320 is shown positioned within range slot 318 in close proximity to the terminal end of first cam pathway 322 for positioning range sleeve 146 in its high-range (H) position. Accordingly, when mode select mechanism 56 signals that the vehicle operator has selected the part-time four-wheel high-range drive mode, controller 50 sends a control signal to rotary actuator 292 for generating sufficient output torque to rotate sector plate 300 to the PT-H sector position shown. To provide means for holding sector plate 300 in its PT-H sector position, power transfer system 10 includes a brake 334, schematically shown in FIGS. 2 and 6. Brake 334 is an electrically-controlled spring-applied device that is operable in a "power-off" condition for braking inertial loads (i.e., rotation) of output member 296 of rotary actuator 292 and, in turn, actuator shaft 302. During controlled rotation of sector plate 300, an electrical signal from controller 50 maintains brake 334 in its "power-on" condition. However, once sector plate 300 has been rotated to its PT-H position, power to brake 334 is interrupted to shift it into its power-off condition, thereby locking actuator shaft 302 against rotation.

When mode select mechanism 56 signals selection of the full-time four-wheel high-range drive mode, sector plate 300 is caused to rotate about axis 304 in a first (i.e., clockwise) direction from the PT-H position shown, whereby the, contour of fourth cam pathway 328 in mode slot 308 causes axial displacement oil crowned roller 310 from the (PT) position toward a full-time (FT) position. Such movement of crowned roller 310 causes concurrent pivotal movement of lever arm 278 in a direction away from transfer clutch 44 which permits return spring 290 to axially shift thrust mechanism 272 so as to cause a proportional decrease in the clutch engagement force exerted on interleaved clutch plates by thrust mechanism 272. During such rotation of sector plate 300, the contour of first cam pathway 322 maintains range sleeve 146 in its (H) position. Moreover, once crowned roller 310 is in the (FT) position, lever arm 278 does not exert a clutch engagement force on thrust mechanism 272 and transfer clutch 44 is considered to be non-actuated, thereby permitting unrestricted speed differentiation between front and rear drivelines 12 and 14, respectively.

According to the present invention, when transfer case 20 is operating in the full-time four-wheel high-range drive mode, the electronically-controlled slip limiting/torque-biasing arrangement is active for controlling transfer clutch 44 "on-demand". Specifically, the actuated state of rotary actuator 292 is continuously monitored and varied in accordance with specific predefined relationships established based on the current value of the sensor input signals. Thus, in the full-time four-wheel high-range drive mode, power transfer system 10 acts as an on-demand system for continuously monitoring and automatically regulating the actuated condition of transfer clutch 44 in a manner that is independent of any deliberate action by the vehicle operator. The magnitude of clutch actuation is defined between the limits of bi-directional sector rotation between its PT-H (i.e., fully-actuated) and FT-H (i.e., non-actuated) sector positions. Moreover, the magnitude of the clutch engagement force generated by lever arm 278 and applied to transfer clutch 44 is proportional to the magnitude of the output torque generated by rotary actuator 292 which, in turn, is proportional to the magnitude of the electrical control signal (i.e., percentage duty cycle) applied to rotary actuator 292. Thus, the amount of drive torque transferred across transfer clutch 44 is also proportional to the magnitude of the control signal.

Power transfer system 10 is also operable to permit transfer case 20 to be shifted out of either of the part-time and full-time four-wheel high-range drive modes and into a "Neutral" mode as well as into a full-time four-wheel low-range drive mode and a part-time four-wheel low-range drive mode. Specifically, upon mode select mechanism 56 signalling selection of the Neutral mode, rotary actuator 292 is actuated for causing sector plate 300 to rotate in the first direction for locating crowned roller 310 within fifth cam pathway 330 of mode slot 308 and range pin 320 within second cam pathway 324 of range slot 318. The contour of fifth cam pathway 330 is designed to retain crowned roller 310 in the (FT) position, whereby transfer clutch 44 is maintained in this non-actuated condition. However, range pin 320 is axially displaced due to the contour of second cam pathway 324 for shifting range sleeve 146 from its high-range (H) position into its Neutral (N) position.

When the full-time four-wheel low-range drive mode is selected, sector plate 300 is rotated in the first direction through the N sector position and into the FT-L sector position. Upon such movement, crowned roller 310 is guided in fifth cam pathway 330 of mode slot 308 for maintaining crowned roller 310 in the (FT) position while range pin 320 is guided within second cam pathway 324 to axial shift range sleeve 146 into its low-range (L) position. Thus, during "range" shifting of range sleeve 146 between its three distinct positions, sector plate 300 is configured to maintain transfer clutch 44 its non-actuated condition to eliminate the possibility of overloading. Preferably, "on-demand" operation in the full-time four-wheel low-range drive mode is similar to that disclosed above for operation in the full-time four-wheel high-range drive mode, wherein rotary actuator 292 is actuated in accordance with specific predefined relationships established based on the current value of the sensor input signals for rotatably driving sector plate 300 to a desired position between the limit of its FT-L and PT-L sector positions. Transfer clutch 44 is non-actuated when sector plate 300 is in its FT-L position and is fully-actuated when sector plate 300 is in its PT-L position. Accordingly, the modulation range is established between the limits of bi-directional sector rotation of sector plates between its FT-L and PT-L positions for causing movement of crowned roller 310 within sixth cam pathway 328 of mode slot 308 between the (FT) and (PT) position while range pin 320 is maintained in its (L) position due to the contour of third cam pathway 326.

Finally, transfer case 20 can be shifted into its part-time four-wheel low-range drive mode by causing sector plate 300 to be rotated to its PT-L position. In this position, crowned roller 310 is positioned in sixth cam pathway 332 in close, proximity to its terminal end for locating crowned roller 310 in the (PT) position while range pin 320 is located in close proximity to the terminal end of third cam pathway for positioning range sleeve 146 in its low-range (L) position. Again, brake 334 can be thereafter shifted into its power-off condition for mechanically locking sector plate 300 in its PT-L sector position. While the above description detailed the movement of crowned roller 310 (and lever arm 276) and pin 320 (and range sleeve 146) upon rotation of sector plate 300 in a first direction, those skilled in the art will understand that actuator 292 is operable to rotate sector plate 300 in both directions to facilitate any desired shift between available modes. Moreover, while power transfer system 10 is disclosed to provide five different drive modes, in some applications it may decided to limit the selection of available drive modes. For example, it is contemplated that mode select mechanism 56 could be easily adapted to permit selection of three drive modes, namely, the full-time four-wheel high-range drive mode, the Neutral mode, and the part-time four-wheel low-range drive mode. However, those skilled in the art will recognize that the above-described structure for sector plate 300 would still be applicable.

Figure 6:
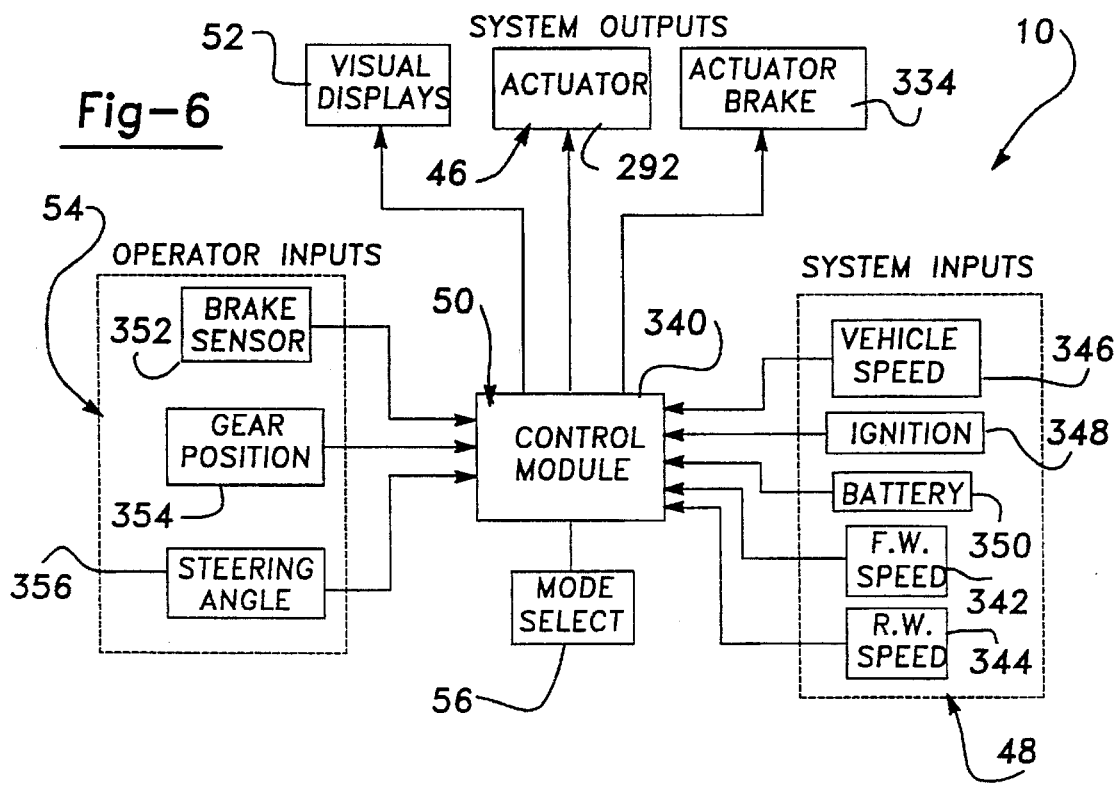
FIG. 6 is a block diagram of a control system for the power transfer system of the present invention.

With particular reference now to FIG. 6, a block diagram of a control system associated with power transfer system 10 is shown. Preferably, controller 50 is an electronic control module 340 having signal processing and information storage capabilities. In addition, first sensor group 48 is shown as a group various "system" sensors that are provided for detecting and signaling specific dynamic and operational characteristics of the motor vehicle. The input signals generated by the "systems" sensors are delivered to electronic control module 340. Preferably, these sensors include a front speed sensor 342 for sensing the rotational speed ($n_F$) of front drive shaft 30, a rear speed sensor 344 for sensing the rotational speed ($n_R$) of rear drive shaft 40, a vehicle speed sensor 346 for sensing a vehicle, speed (V), an ignition switch 348 for signalling the operational status of the vehicle, and a battery input 350 for powering electronic control module 340. In vehicles equipped with an anti-lock brake system (ABS), the original equipment ABS sensors provided at each wheel can be used for determining an "average" front drive shaft speed and rear drive shaft speed. Alternatively, front and rear speed sensors 342 and 344, respectively, can be arranged for directly measuring the speed of front output shaft 32 and rear output shaft 42, respectively. Moreover, it is possible for vehicle speed sensor 346 to be eliminated with the vehicle speed signal (V) being computed from the lower valued one of rotational speed signals ($n_F$) and ($n_R$). However, it is to be understood that any suitable speed sensing arrangement capable of generating a signal indicative of the rotational speed of a shaft is fairly within the scope of the present invention.

The control system also utilizes various "operator-initiated" inputs, as generally categorized by second sensor group 54. These inputs include a brake sensor 352 for sensing when the vehicle operator is applying the brakes, a gear position sensor 354 for sensing a gear position of transmission 18, a steering angle sensor 356 for detecting the magnitude of a steering angle ($\Phi$), and an accelerator sensor 358 for sensing an accelerating condition of the vehicle. Preferably, the accelerator sensor 358 is a throttle position sensor for sensing the degree of opening of a throttle valve associated with engine 16 or for sensing the degree of depression of an accelerator pedal and to produce a throttle position signal (A). The operator-initiated input signals are delivered to control module 340 where they are used, in conjunction with the system input signals.

Figure 9:
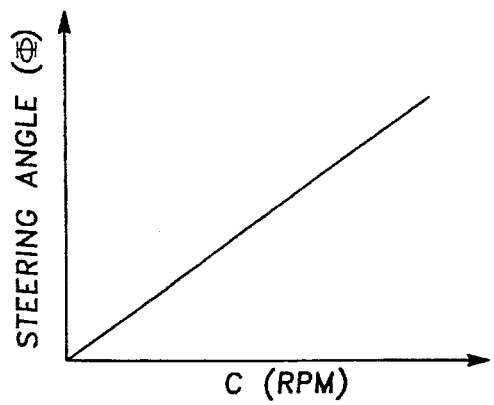
FIG. 9 is an exemplary plot of a relationship between steering angle and a control characteristic used for modifying the speed differential signal.
Figure 7:
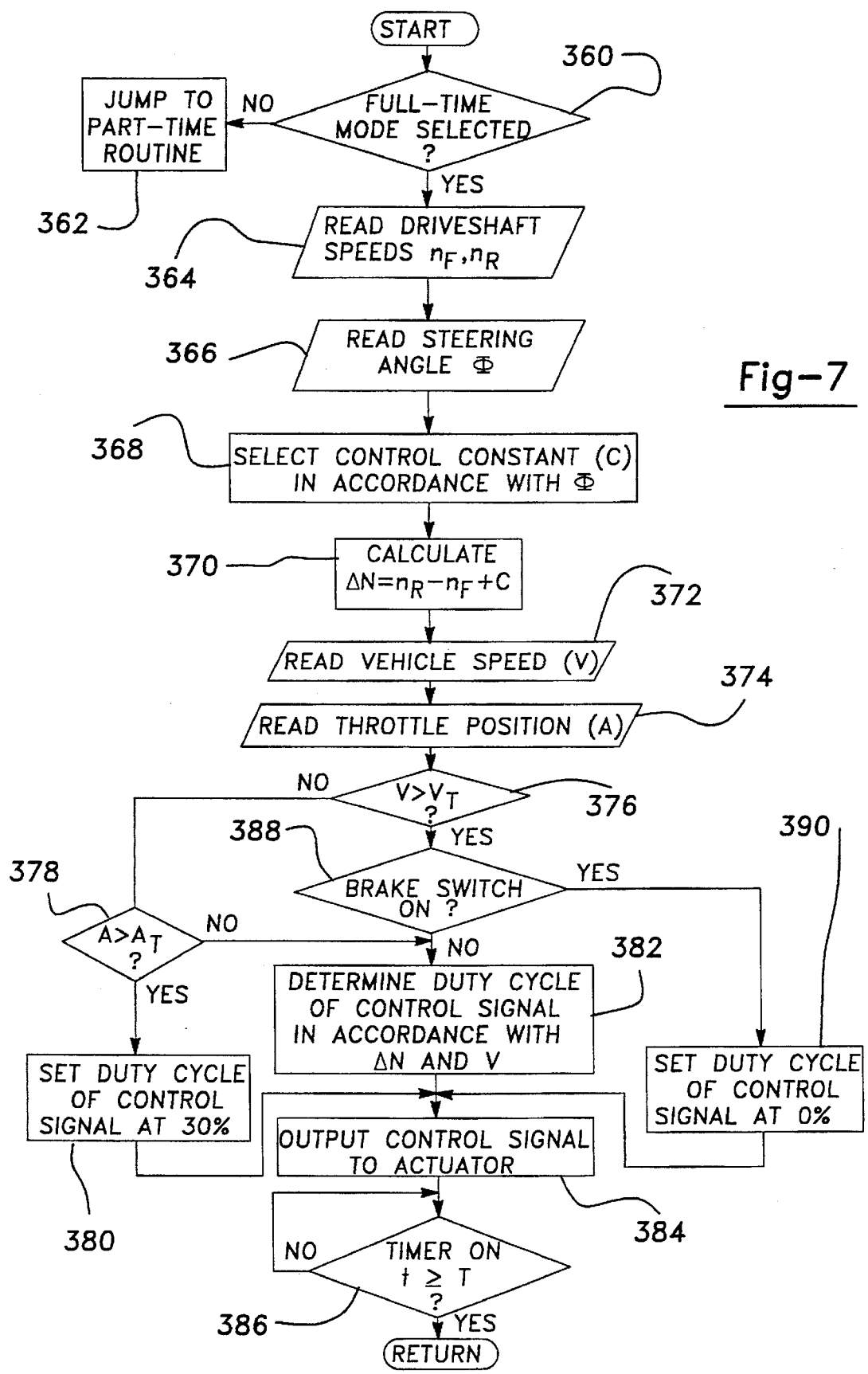
FIG. 7 is a flow chart depicting a control sequence for the operations performed by the control system of FIG. 6.

With reference now to FIG. 7, a control sequence for the selection and the subsequent automatic control of the full-time drive modes is shown in a flow chart. In general, flow chart represents a sequence of operations performed by electronic control module 340 which are diagrammatically shown in block form. When mode select mechanism 56 signals selection of an available full-time mode, as indicated by block 360, a succession of control steps are repeated for determining the value of the control signal to be applied to electric rotary actuator 292. In the preferred form, the control signal is selected in accordance with various pre-defined relationships between the current value of a front and rear driveline speed differential ($\Delta N$) and vehicle speed (V), as modified by current value of the steering angle ($\Phi$) and other operator-initiated inputs. However, if any other mode is selected, then the control sequence jumps to a part-time routine, as indicated by block 362. Block 364 is representative of the control step in which the current value of the rotational speed of front drive shaft ($n_F$) and rear drive shaft ($n_R$) are read. Block 366 indicates the step of reading the value of steering angle ($\Phi$) as detected by steering angle sensor 356. Block 368 represents the operation of selecting a control characteristic (C) in accordance with the steering angle ($\Phi$). FIG. 9 illustrates a plot of an exemplary relationship, that may be stored as a look-up table or computed from an arithmetic equation, which correlates the control characteristic (C) as a function of the detected steering angle ($\Phi$). Next, block 370 represents the step of calculating the value of the speed differential ($\Delta N$) according to the equation $$\Delta N = n_R - n_F + C$$

Blocks 372 and 374 indicate the steps of reading the current value of the vehicle speed (V) as detected by vehicle speed sensor 346 and the throttle position (A) as detected by throttle position sensor. As shown in block 376, control mode determines whether the vehicle speed (V) exceeds a predefined threshold value ($V_T$) such as, for example, 5 mph. If the vehicle speed is less than the, threshold value ($V_T$), a second determination is made (block) 378 as to whether the value of the throttle position (A) exceeds a predefined threshold value ($A_T$) such as, for example, a 50% accelerator pedal depression angle. If the vehicle speed (V) is less than its threshold value ($V_T$) and the throttle position (A) exceeds its threshold value ($A_T$), then the magnitude (i.e., percentage of duty cycle) of the electric control signal is set as a preset value, such as 30% duty cycle, as indicated by block 380. In this manner, power transfer system 10 is adapted to transfer increased drive torque to front wheels 24 in response to quick acceleration at low vehicle speeds to inhibit anticipated wheel slip. However, if the value of the throttle position (A) is less than its threshold value ($A_T$), then the magnitude of the duty cycle for the control signal is set in accordance with predefined relationships between the speed differential ($\Delta N$) and vehicle speed (V), as indicated by block 382. Block 384 represents the step of outputting the electric control signal to actuator 292 for developing the desired amount of torque transfer, if any, across transfer clutch 44. As shown in block 386, a timer circuit actuated simultaneously with energization of actuator 292 for maintaining such energization for a predetermined time period (T). Once the period of energization (t) equals the predetermined time period (T), control module 340 repeats the control routine.

To enhance steering control, block 388 is indicative of the control step between steps 376 and 382 for determining whether the vehicle operator is applying the brakes when the vehicle speed (V) is greater than the threshold value ($VT_T$). Accordingly, if the vehicle operator is attempting to stop the vehicle, by applying the brakes (as sensed by brake sensor 352) during an occurrence of a low traction road condition and the vehicle speed (V) is greater than the predefined threshold ($V_T$), then control module 340 sets the magnitude of the control signal sent to actuator 292 to zero (block 390) for de-actuating transfer clutch 44. This control sequence prevents simultaneous braking and torque-modulated four-wheel drive operation for providing the vehicle operator with greater steering and braking control. However, during the occurrence of a low traction condition when brake sensor 352 signals control module 340 that the vehicle operator is not applying the brakes, electronic control module 340 automatically energizes actuator 292 (block 384) for actuating transfer clutch 44 in accordance with the relationships generally denoted by block 382.

Figure 8:
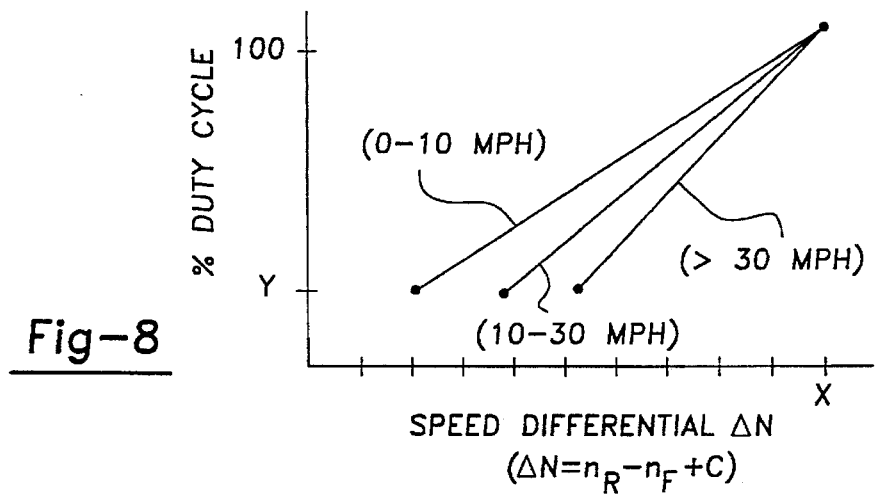
FIG. 8 illustrates plots of relationships between wheel speed differential signals at various vehicle speed ranges and the electrical control signal supplied by the control system to the actuator for controlling the amount of torque transferred through the clutch assembly.

With particular reference to FIG. 8, a set of exemplary plots used for establishing the magnitude of the duty cycle in response to the current value of the speed differential ($\Delta N$) and the vehicle speed (V) during full-time operation, as diagrammatically referred to by block 360 in FIG. 7, will now be detailed. As seen, power transfer system 10 is programmed to correlate the percentage duty cycle of the electric control signal to a range of speed differential ($\Delta N$) values. In general, the percentage duty cycle for the control signal increases from a minimum actuation value (Y %) to a maximum actuation value (100%) as the value of the speed differential ($\Delta N$), within a particular vehicle speed range, increases from a minimum speed differential limit to a maximum speed differential limit (X). As such, when the value of the speed differential ($\Delta N$) is less than the minimum speed differential limit, no drive torque is transferred through transfer clutch 44. However, when the value of the speed differential ($\Delta N$) exceeds the minimum differential limit, a control signal is supplied to actuator 292 having a duty cycle value greater than (Y %). Thus, the minimum actuation duty cycle (Y %) for the control signal correlates to the point at which sufficient frictional engagement between the interleaved clutch plates results in the delivery of a portion of the total drive torque to slower turning output shaft of transfer case 20 for initiating "on-demand" limited slip control during a full-time four-wheel drive operation.

Preferably, the portion of the total drive torque transferred through transfer clutch 44 to the slower turning output shaft increases as the magnitude of the duty cycle for the control signal increases from the minimum actuation value (Y %) to the maximum actuation value (100%). Preferably, the maximum value (X) of the speed differential ($\Delta N$) correlates to the maximum actuation duty cycle (100%) at which point the maximum clutch engagement force is generated for completely locking-up transfer clutch 44. Part-time routine 362 is directed to controlling power transfer system 10 when the vehicle operator selects a operational mode via mode select mechanism 56 other than one of the full-time four-wheel drive modes, wherein control module 340 is adapted to supply a control signal to actuator 292 for rotating sector plate 300 to the particular sector position corresponding to the selected drive mode.

Due to the use of bi-directional synchronized range shift mechanism 104, transfer case 20 can be shifted "on-the-fly" into any available drive mode without the requirement that the motor vehicle be in a non-motive condition. Preferably, the synchronizing capacity of synchronizer clutch apparatus 122 is selected to prevent high-range to low-range shifts when the vehicle speed exceeds a predetermined speed, most preferably in the range of about 30 to 50 miles per hour. Alternatively, synchronizer clutch apparatus 122 can be equipped with a shift inhibitor mechanism for preventing such a high to low range shift above a certain vehicle speed. Commonly-owned U.S. Pat. No. 4,901,835 to Frost discloses one type of shift inhibitor applicable for use with the present invention. Such shift prevention can likewise be controlled electronically in association with the control system of the present invention. As will also be appreciated, any suitable type of synchronizer device (i.e., single-cone, dual-cone, multi-cone, strut-type, strutless, etc.) can be used with synchronized range shift mechanism 104.

The foregoing discussion discloses and describes the preferred structure and controls presently contemplated for the present invention. However, one skilled in the art will readily recognize from such discussion, and from the accompanying drawings and claims, that various changes, modifications and variations can be made therein without departing from the true spirit and fair scope of the invention as defined in the following claims.

What is claimed is:

1. A power transfer system for a four-wheel drive motor vehicle having a power source and front and rear drivelines, comprising:

a transfer case including a housing; an input shaft rotatably supported in said housing and driven by the power source; a front output shaft rotatably supported in said housing and coupled to the front driveline; a rear output shaft rotatably supported in said housing and coupled to the rear driveline; a mainshaft; a planetary gear assembly operable for selectively coupling said input shaft to said mainshaft to define a high-range drive mode whereat said mainshaft is driven at a direct speed ratio relative to said input shaft and a low-range drive mode whereat said mainshaft is driven at a reduced speed ratio relative to said input shaft, said planetary gear assembly having a first member driven by said input shaft, a second member, and a third member driving said mainshaft and interconnecting said first member to said second member; a clutch apparatus including a range sleeve supported for rotation with said second member of said planetary gear assembly and movement between a first range position whereat said range sleeve couples said second member to said third member for establishing said high-range drive mode and a second range position whereat said range sleeve couples said second member to said housing for establishing said low-range drive mode, and synchronizer means for causing speed synchronization between said second member and said third member in response to movement of said range sleeve to said first range position, said synchronizer means further operable for causing speed synchronization between said second member and said housing in response to movement of said range sleeve to said second range position; an interaxle differential interconnecting said mainshaft to said front and rear output shafts for permitting speed differentiation therebetween, said interaxle differential including an input driven by said mainshaft, a first output interconnecting said input to said front output shaft, and a second output interconnecting said input to said rear output shaft; a transfer clutch operable for controlling speed differentiation across said interaxle differential, said transfer clutch including a set of first clutch plates supported for rotation with said first output of said interaxle differential, a set of second clutch plates supported for rotation with said second output of said interaxle differential and which are alternately interleaved with said first clutch plates, and a thrust mechanism movable between a first mode position whereat a minimum clutch engagement force is exerted on said clutch plates for permitting unrestricted speed differentiation between said front and rear output shafts, and a second mode position whereat a maximum clutch engagement force is exerted on said clutch plates for inhibiting speed differentiation; a drive mechanism interconnected to said range sleeve and said thrust mechanism for controlling coordinated movement thereof, said drive mechanism being movable between a FT-H position whereat said range sleeve is located in said first range position and said thrust mechanism is located in said first mode position, a PT-H position whereat said range sleeve is located in said first range position and said thrust mechanism is located in said second mode position, and a PT-L position whereat said range sleeve is located in said second range position and said thrust mechanism is located in said second mode position; and an actuator for selectively moving said drive mechanism;

sensor means for detecting dynamic and operational characteristics of the motor vehicle and generating sensor input signals indicative thereof;

a mode select mechanism for enabling a vehicle operator to select one of a full-time four-wheel high-range drive mode and a part-time four-wheel low-range drive mode and generating a mode signal indicative of the particular mode selected; and a controller for controlling actuation of said actuator in response to said mode signal and said sensor input signals, said controller operable for causing said actuator to move said drive mechanism between said FT-H and PT-H positions as a function of said sensor input signals when said mode signal indicates selection of said full-time four-wheel high-range drive mode, and said controller operable for causing said actuator to move said drive mechanism to said PT-L position when said mode signal indicates selection of said part-time four-wheel low-range drive mode.

2. The power transfer system of claim 1 wherein said mode select mechanism is further operable for enabling the vehicle operator to select a part-time four-wheel high-range drive mode and generate a mode signal indicative thereof, said controller causing said actuator to move said drive mechanism to said PT-H position when said mode signal indicates selection of said part-time four-wheel high-range drive mode.

3. The power transfer system of claim 1 wherein said range sleeve is movable to a third range position whereat said second member of said planetary gear assembly is uncoupled from said third member and said housing for establishing a non-driven mode, wherein said drive mechanism is movable to a N position whereat said range sleeve is located in said third range position and said thrust mechanism is located in said first mode position, and wherein said mode select mechanism is operable for enabling the vehicle operator to select a neutral mode with a mode signal indicative thereof causing said controller to actuate said actuator for moving said drive mechanism to said N position.

4. The power transfer system of claim 1 wherein said transfer clutch is non-actuated when said thrust mechanism is in said first mode position and is fully-actuated when said thrust mechanism is in said second mode position, and wherein the actuated condition of said transfer clutch is continuously varied between said non-actuated and fully-actuated states in response to changes in the magnitude of said sensor input signals for automatically controlling speed differentiation across said interaxle differential.

5. The power transfer system of claim 1 wherein said first member of said planetary gear assembly is a sun gear, said second member is a ring gear, and said third member is a carrier assembly having pinion gears journally supported therefrom and which are meshed with said sun gear and said ring gear.

6. The power transfer system of claim 5 wherein said clutch apparatus includes a reaction member coupled for rotation with said ring gear, a brake plate fixed to said housing, a direct-drive hub supported for rotation with said mainshaft, a clutch hub fixed for rotation with said reaction member and on which said range sleeve is supported for rotation therewith and axial sliding movement thereon between said first and second range positions, and wherein said synchronizer means includes a first synchronizer assembly disposed between said clutch hub and said direct-drive hub for facilitating speed synchronization between said ring gear and said carrier assembly in response to movement of said range sleeve to said first range position whereat said range sleeve couples said clutch hub to said direct-drive hub, said synchronizer means further including a second synchronizer assembly operably disposed between said clutch hub and said brake plate for braking rotary movement of said ring gear in response to movement of said range sleeve to said second range position whereat said range sleeve couples said clutch hub to said brake plate.

7. The power transfer system of claim 1 wherein said sensor means is operative for sensing the rotational speed of said front and rear output shafts and respectively generating front and rear speed signals indicative thereof, and further wherein said controller is operative for receiving said front and rear speed signals and generating a speed differential signal that is indicative of the speed differential between said first and second outputs of said interaxle differential, said controller operable for causing said actuator to move said drive mechanism toward said PT-H position in response to increasing values in said speed differential signal.

8. A power transfer system for a four-wheel drive motor vehicle having a power source and front and rear drivelines, comprising:

a transfer case including a housing; an input shaft rotatably supported in said housing and driven by the power source; a front output shaft rotatably supported in said housing and coupled to the front driveline; a rear output shaft rotatably supported in said housing and coupled to the rear driveline; a mainshaft; a planetary gear assembly operable for selectively coupling said input shaft to said mainshaft to define a high-range drive mode whereat said mainshaft is driven at a direct speed ratio relative to said input shaft and a low-range drive mode whereat said mainshaft is driven at a reduced speed ratio relative to said input shaft, said planetary gear assembly having a first member driven by said input shaft, a second member, and a third member driving said mainshaft and interconnecting said first member to said second member; a clutch apparatus including a range sleeve supported for rotation with said second member of said planetary gear assembly and movement between a first range position whereat said range sleeve couples said second member to said third member for establishing said high-range drive mode, a second range position whereat said range sleeve couples said second member to said housing for establishing said low-range drive mode, and a third range position whereat said range sleeve uncouples said second member from said third member and said housing for establishing a non-driven mode, and synchronizer means for causing speed synchronization between said second member and said third member in response to movement of said range sleeve to said first range position, said synchronizer means further operable for causing speed synchronization between said second member and said housing in response to movement of said range sleeve to said second range position; an interaxle differential interconnecting said mainshaft to said front and rear output shafts for permitting speed differentiation therebetween, said interaxle differential including an input driven by said mainshaft, a first output interconnecting said input to said front output shaft, and a second output interconnecting said input to said rear output shaft; a transfer clutch operable for controlling speed differentiation across said interaxle differential, said transfer clutch including a set of first clutch plates supported for rotation with said first output of said interaxle differential, a set of second clutch plates supported for rotation with said second output of said interaxle differential and which are alternately interleaved with said first clutch plates, and a thrust mechanism movable between a first mode position whereat a minimum clutch engagement force is exerted on said clutch plates for permitting unrestricted speed differentiation between said front and rear output shafts, and a second mode position whereat a maximum clutch engagement force is exerted on said clutch plates for inhibiting speed differentiation; a drive mechanism interconnected to said range sleeve and said thrust mechanism for controlling coordinated movement thereof, said drive mechanism being movable between a PT-H position whereat said range sleeve is located in said first range position and said thrust mechanism is located in said second mode position, a FT-H position whereat said range sleeve is located in said first range position and said thrust mechanism is located in said first mode position, a N position whereat said range sleeve is located in said third range position and said thrust mechanism is located in either of said first and second mode positions, and a PT-L position whereat said range sleeve is located in said second range position and said thrust mechanism is located in said second mode position; and an actuator for selectively moving said drive mechanism;

sensor means for detecting dynamic and operational characteristics of the motor vehicle and generating sensor input signals indicative thereof;

a mode select mechanism for enabling a vehicle operator to select one of a part-time four-wheel high-range drive mode, a full-time four-wheel high-range drive mode, a neutral mode, and a part-time four-wheel low-range drive mode, said mode select mechanism generating a mode signal indicative of the particular mode selected; and a controller for controlling actuation of said actuator in response to said mode signal and said sensor input signals, said controller operable for causing said actuator to move said drive mechanism to said PT-H position when said mode signal indicates selection of said part-time four-wheel high-range drive mode, said controller operable for causing said actuator to move said drive mechanism between said FT-H and PT-H positions as a function of said sensor input signals when said mode signal indicates selection of said full-time four-wheel high-range drive mode, said controller causing said actuator to move said drive mechanism to said N position when said mode signal indicates selection of said neutral mode, and said controller causing said actuator to move said drive mechanism to said PT-L position when said mode signal indicates selection of said part-time four-wheel low-range drive mode.

9. The power transfer system of claim 8 wherein said transfer clutch is non-actuated when said thrust mechanism is in said first mode position and is fully-actuated when said thrust mechanism is in said second mode position, and wherein the actuated condition of said transfer clutch is continuously varied between said non-actuated and fully-actuated states in response to changes in the magnitude of said sensor input signals for automatically controlling speed differentiation across said interaxle differential.

10. The power transfer system of claim 8 wherein said first member of said planetary gear assembly is a sun gear, said second member is a ring gear, and said third member is a carrier assembly having pinion gears journally supported therefrom and which are meshed with said sun gear and said ring gear.

11. The power transfer system of claim 10 wherein said clutch apparatus includes a reaction member coupled for rotation with said ring gear, a brake plate fixed to said housing, a direct-drive hub supported for rotation with said mainshaft, a clutch hub fixed for rotation with said reaction member and on which said range sleeve is supported for rotation therewith and axial sliding movement thereon between said first, second and third range positions, and wherein said synchronizer means includes a first synchronizer assembly disposed between said clutch hub and said direct-drive hub for facilitating speed synchronization between said ring gear and said carrier assembly in response to movement of said range sleeve toward said first range position whereat said range sleeve couples said clutch hub to said direct-drive hub, said synchronizer means further including a second synchronizer assembly operably disposed between said clutch hub and said brake plate for braking rotary movement of said ring gear in response to movement of said range sleeve toward said second range position whereat said range sleeve couples said clutch hub to said brake plate.

12. The power transfer system of claim 8 wherein said sensor means is operative for sensing the rotational speed of said front and rear output shafts and respectively generating front and rear speed signals indicative thereof, and further wherein said controller is operative for receiving said front and rear speed signals and generating a speed differential signal that is indicative of the speed differential between said first and second outputs of said interaxle differential, said controller operable for causing said actuator to move said drive mechanism toward said PT-H position in response to increasing values in said speed differential signal.

13. A transfer case for use in a four-wheel drive motor vehicle having a power source, front and rear drivelines, sensors for detecting dynamic characteristics of the motor vehicle, and an electronic controller for generating control signals in response to the sensor signals, said transfer case comprising:

a housing;

an input shaft rotatably supported in said housing and driven by the power source;

a front output shaft rotatably supported in said housing and coupled to the front driveline;

a rear output shaft rotatably supported in said housing and coupled to the rear driveline;

a mainshaft;

a planetary gear assembly operable for selectively coupling said input shaft to said mainshaft to define a high-range drive mode whereat said mainshaft is driven at a direct speed ratio relative to said input shaft and a low-range drive mode whereat said mainshaft is driven at a reduced speed ratio relative to said input shaft, said planetary gear assembly having a sun gear driven by said input shaft, a ring gear, and a carrier assembly driving said mainshaft and having pinion gears journally supported therefrom that are meshed with said sun gear and ring gear;

a clutch apparatus including a range sleeve supported for rotation with said ring gear and movement between a first range position whereat said range sleeve couples said ring gear to said carrier assembly for establishing said high-range drive mode and a second range position whereat said range sleeve couples said ring to said housing for establishing said low-range drive mode, and synchronizer means for causing speed synchronization between said ring gear and said carrier assembly in response to movement of said range sleeve to said first range position, said synchronizer means further operable for causing speed synchronization between said ring gear and said housing in response to movement of said range sleeve to said second range position;

an interaxle differential interconnecting said mainshaft to said front and rear output shafts for permitting speed differentiation therebetween, said interaxle differential including an input driven by said mainshaft, a first output interconnecting said input to said front output shaft, and a second output interconnecting said input to said rear output shaft;

a transfer clutch operable for controlling speed differentiation across said interaxle differential, said transfer clutch including a set of first clutch plates supported for rotation with said first output of said interaxle differential, a set of second clutch plates supported for rotation with said second output and alternately interleaved with said first clutch plates, and a thrust mechanism movable between a first mode position whereat a minimum clutch engagement force is generated and said transfer clutch is in a non-actuated state for permitting unrestricted speed differentiation between said front and rear output shafts, and a second mode position whereat a maximum clutch engagement force is generated and said transfer clutch is in a fully-actuated state for inhibiting speed differentiation;

a drive mechanism interconnected to said range sleeve and said thrust mechanism for controlling coordinated movement thereof, said drive mechanism being movable between a FT-H position whereat said range sleeve is located in said first range position and said thrust mechanism is located in said first mode position, a PT-H position whereat said range sleeve is located in said first range position and said thrust mechanism is in said second mode position, and a PT-L position whereat said range sleeve is located in said second range position and said thrust mechanism is located in said second mode position;

an actuator for selectively moving said drive mechanism; and a mode select mechanism for enabling a vehicle operator to select one of a full-time four-wheel high-range drive mode and a part-time four-wheel low-range drive mode and generating a mode signal indicative of the particular mode selected;

whereby the controller actuates said actuator in response to said mode signal and the sensor signals, the controller being operable for causing said actuator to move said drive mechanism between said FT-H and PT-H positions as a function of the sensor signals when said full-time four-wheel high-range drive mode is selected for automatically controlling speed differentiation across said interaxle differential, and the controller being operable for causing said actuator to move said drive mechanism to said PT-L position when said part-time four-wheel low-range drive mode is selected.

14. The power transfer system of claim 13 wherein said mode select mechanism is further operable for enabling the vehicle operator to select a part-time four-wheel high-range drive mode and generate a mode signal indicative thereof, the controller causing said actuator to move said drive mechanism to said PT-H position when said part-time four-wheel high-range drive mode is selected.

15. The power transfer system of claim 13 wherein said range sleeve is movable to a third range position whereat said ring gear of said planetary gear assembly is uncoupled from said carrier assembly and said housing for establishing a non-driven mode, wherein said drive mechanism is movable to a N position whereat said range sleeve is located in said third range position and said thrust mechanism is located in one of said first and second mode positions, and wherein said mode select mechanism is operable for enabling the vehicle operator to select a neutral mode with a mode signal indicative thereof causing the controller to actuate said actuator for moving said drive mechanism to said N position.

16. The power transfer system of claim 13 wherein the actuated condition of said transfer clutch is continuously varied between said non-actuated and fully-actuated states in proportion to changes in the magnitude of the sensor signals for automatically and continuously controlling speed differentiation across said interaxle differential.

17. The power transfer system of claim 13 wherein said clutch apparatus includes a reaction member coupled for rotation with said ring gear, a brake plate fixed to said housing, a direct-drive hub supported for rotation with said mainshaft, a clutch hub fixed for rotation with said reaction member and on which said range sleeve is supported for rotation therewith and axial sliding movement thereon between said first and second range positions, and wherein said synchronizer means includes a first synchronizer assembly disposed between said clutch hub and said direct-drive hub for facilitating speed synchronization between said ring gear and said carrier assembly in response to movement of said range sleeve toward said first range position whereat said range sleeve couples said clutch hub to said direct-drive hub, said synchronizer means further including a second synchronizer assembly operably disposed between said clutch hub and said brake plate for braking rotary movement of said ring gear in response to movement of said range sleeve toward said second range position whereat said range sleeve couples said clutch hub to said brake plate.

* * * * *

UNITED STATES PATENT AND TRADEMARK OFFICE
CERTIFICATE OF CORRECTION

PATENT NO. : 5,655,986

DATED : Aug. 12, 1997

INVENTOR(S) : Robert J. Wilson, et al

It is certified that error appears in the above-identified patent and that said Letters Patent is hereby corrected as shown below:

| | |
|---|---|
| ON THE TITLE PAGE, [73] Assignee: | Insert Assignee --NEW VENTURE GEAR, INC.-- |
| Column 1, line 27 | "mad" should be --road--. |
| Column 1, line 62 | After "device" insert --for--. |
| Column 4, line 57 | After "axle" delete --,--. |
| Column 5, line 18 | "of" should be --or--. |
| Column 6, line 63 | "21" should be --121--. |
| Column 8, line 60 | "a" should be --an--. |
| Column 10, line 13, | "an" should be --a--. |
| Column 11, line 67 | "oil" should be --of--. |
| Column 13, line 1, | After "44" insert --in--. |
| Column 13, line 38 | After "may" insert --be--. |

UNITED STATES PATENT AND TRADEMARK OFFICE
CERTIFICATE OF CORRECTION

PATENT NO. : 5,655,986
DATED : Aug. 12, 1997
INVENTOR(S) : Robert J. Wilson, et al It is certified that error appears in the above-identified patent and that said Letters Patent is hereby corrected as shown below:

Column 21, line 43, claim 18          After "ring" insert --gear--.

Signed and Sealed this

Twenty-ninth Day of December, 1998

Attest:

BRUCE LEHMAN

Attesting Officer          Commissioner of Patents and Trademarks